(12) United States Patent
Bhardwaj

(10) Patent No.: US 7,893,658 B2
(45) Date of Patent: Feb. 22, 2011

(54) METHODS AND SYSTEMS FOR BATTERY CHARGING MANAGEMENT

(75) Inventor: Ramesh Chandra Bhardwaj, Fairview, PA (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 11/767,971

(22) Filed: Jun. 25, 2007

(65) Prior Publication Data

US 2008/0315843 A1    Dec. 25, 2008

(51) Int. Cl.
*H02J 7/04* (2006.01)
*H02J 7/16* (2006.01)

(52) U.S. Cl. .................. 320/147; 320/150; 320/152

(58) Field of Classification Search .............. 320/147, 320/150, 152
See application file for complete search history.

(56) References Cited

U.S. PATENT DOCUMENTS

| | | | |
|---|---|---|---|
| 4,413,595 A | 11/1983 | Potts, Jr. | |
| 4,608,639 A | 8/1986 | Morishita et al. | |
| 4,742,290 A | 5/1988 | Sutphin et al. | |
| 5,115,183 A | 5/1992 | Kyoukane et al. | |
| 5,122,723 A | 6/1992 | Sato | |
| 5,339,018 A * | 8/1994 | Brokaw ................... | 320/147 |
| 5,598,085 A * | 1/1997 | Hasler ..................... | 320/145 |
| 5,633,576 A * | 5/1997 | Rose et al. ............... | 320/160 |
| 5,659,240 A * | 8/1997 | King ....................... | 320/134 |
| 5,945,809 A * | 8/1999 | Inaba et al. .............. | 320/134 |
| 6,124,700 A * | 9/2000 | Nagai et al. .............. | 320/132 |
| 6,232,750 B1 * | 5/2001 | Podrazhansky et al. .... | 320/139 |
| 6,281,663 B1 | 8/2001 | Yagi et al. | |
| 6,522,148 B2 * | 2/2003 | Ochiai et al. ............. | 324/428 |
| 6,677,731 B2 | 1/2004 | Ljunggren | |
| 6,850,037 B2 | 2/2005 | Bertness | |
| 6,941,218 B2 | 9/2005 | Wolf et al. | |
| 7,124,691 B2 | 10/2006 | Donnelly et al. | |
| 2003/0042866 A1 * | 3/2003 | Minamiura et al. ....... | 320/104 |
| 2006/0132091 A1 * | 6/2006 | Felder et al. ............. | 320/128 |

* cited by examiner

*Primary Examiner*—Edward Tso
*Assistant Examiner*—Samuel Berhanu
(74) *Attorney, Agent, or Firm*—John A. Kramer, Esq.; Armstrong Teasdale LLP

(57) ABSTRACT

Methods and systems for battery charging are provided. A system includes a battery charger electrically coupled to at least one battery and a plurality of sensors configured to measure a voltage of the battery, a charging current supplied to the battery, and a temperature of the battery wherein the battery charger is configured to determine a state of charge of the battery using at least one of the plurality of sensors to control gassing of the battery during charging.

13 Claims, 3 Drawing Sheets

METHODS AND SYSTEMS FOR BATTERY CHARGING MANAGEMENT

BACKGROUND

This invention relates generally to an energy storage system, and more particularly to a method and apparatus for managing power sources in a vehicle.

At least some known vehicles, for example, railroad locomotives are equipped with systems for automatically starting and stopping their engines when one or more conditions exist. The primary purpose of such systems is to conserve fuel, thereby lowering fuel costs while also preserving precious energy resources. For instance, a locomotive may be configured to automatically shutdown after operating for a certain amount of time in a parked idle state to prevent the locomotive from needlessly wasting fuel. The locomotive may then automatically restart when, for example, an operator signals an intention to motor the locomotive, such as by moving a direction controller (known as a reverser) from a center position (that is, from a "neutral" position). A locomotive may also be configured to automatically restart a certain amount of time following an automatic shutdown, such as two or four hours, or when other conditions exist.

The automatic engine start and stop (AESS) system described above has been implemented not only in locomotives which operate independently, but also in multiple locomotives that operate together (i.e., in consist) for providing cumulative (or reserve) towing capacity. The front locomotive in the consist is usually designated the lead unit while the other locomotives are designated trail units. Each trail unit typically receives a trainline or radio signal representing the position of the lead unit's reverser, and treats that signal as representing the position of its own reverser (which is typically placed in the center position when configuring the locomotive for trail unit operation). In the case where a locomotive's reverser must be in the center position to enable the AESS system, placing the lead unit's reverser in the center position will allow the AESS system to be enabled in each locomotive in the consist. Similarly, in the case where moving an automatically shutdown locomotive's reverser from the center position induces an automatic engine restart, moving the reverser in an automatically shutdown lead unit from the center position induces an automatic restart for each automatically shutdown locomotive in the consist. To start the diesel engine, locomotives include an energy storage system that is utilized to start the diesel engine and to provide electrical power to various devices installed on the locomotive. During operation, an alternator driven by the diesel engine, continuously recharges the energy storage system to ensure that the energy storage system remains charged to a predetermined voltage level.

However, AESS in the locomotive is configured to stop the engine after the engine is idled for a predetermined time to save fuel. Shutting down the engine can occur several times a day and the amount of time available after each start may not allow battery to fully charge. AESS checks the battery voltage and battery current before shutting down the engine, however the charger measures charger voltage and charger current to determine if the engine can be shut down. However, charger current and charger voltage is not accurately indicative of the state of charge of the battery and the engine may be shut down even if the State of Charge (SOC) of the battery is very low. The shut down of engine at low SOC of battery results in a failure to crank the engine at the next restart and road failures.

During charging, the batteries on a locomotive are charged at a voltage based on ambient temperature. In some cases, there is a large difference between ambient temperature and the battery temperature due to long thermal constant of the batteries. The large difference between the battery temperature and the ambient temperature sensor reading provides inaccurate information to the charger causing the charger to charge the batteries at higher voltage than is actually required by the battery state of charge. Charging at this higher voltage results in undesirable gassing of the batteries.

SUMMARY

In one embodiment, a system for battery charging includes a battery charger electrically coupled to at least one battery and a plurality of sensors configured to measure a voltage of the battery, a charging current supplied to the battery, and a temperature of the battery wherein the battery charger is configured to determine a state of charge of the battery using at least one of the plurality of sensors to control gassing of the battery during charging.

In another embodiment, a method of charging a battery includes providing charging current to the battery from a battery charger at a substantially constant voltage determined by the measured temperature of the battery, determining a state of charge of the battery using the charging current, and stopping charging of the battery when the determined state of charge of the battery substantially equals a predetermined state of charge of the battery.

In yet another embodiment, a train locomotive includes an engine, a battery utilized to start the engine, and a battery charger coupled to the battery. The battery charger includes at least one temperature sensor configured to measure the temperature of the battery; and a current sensor configured to measure the charging current supplied to the battery from the battery charger wherein the battery charger is configured to provide charging current to the battery at a substantially constant voltage wherein the voltage is corrected using the measured temperature of the battery.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a systems and methods for charging batteries. However, it is contemplated that this disclosure has general application to managing systems for charging electrochemical storage devices.

Figure 1:
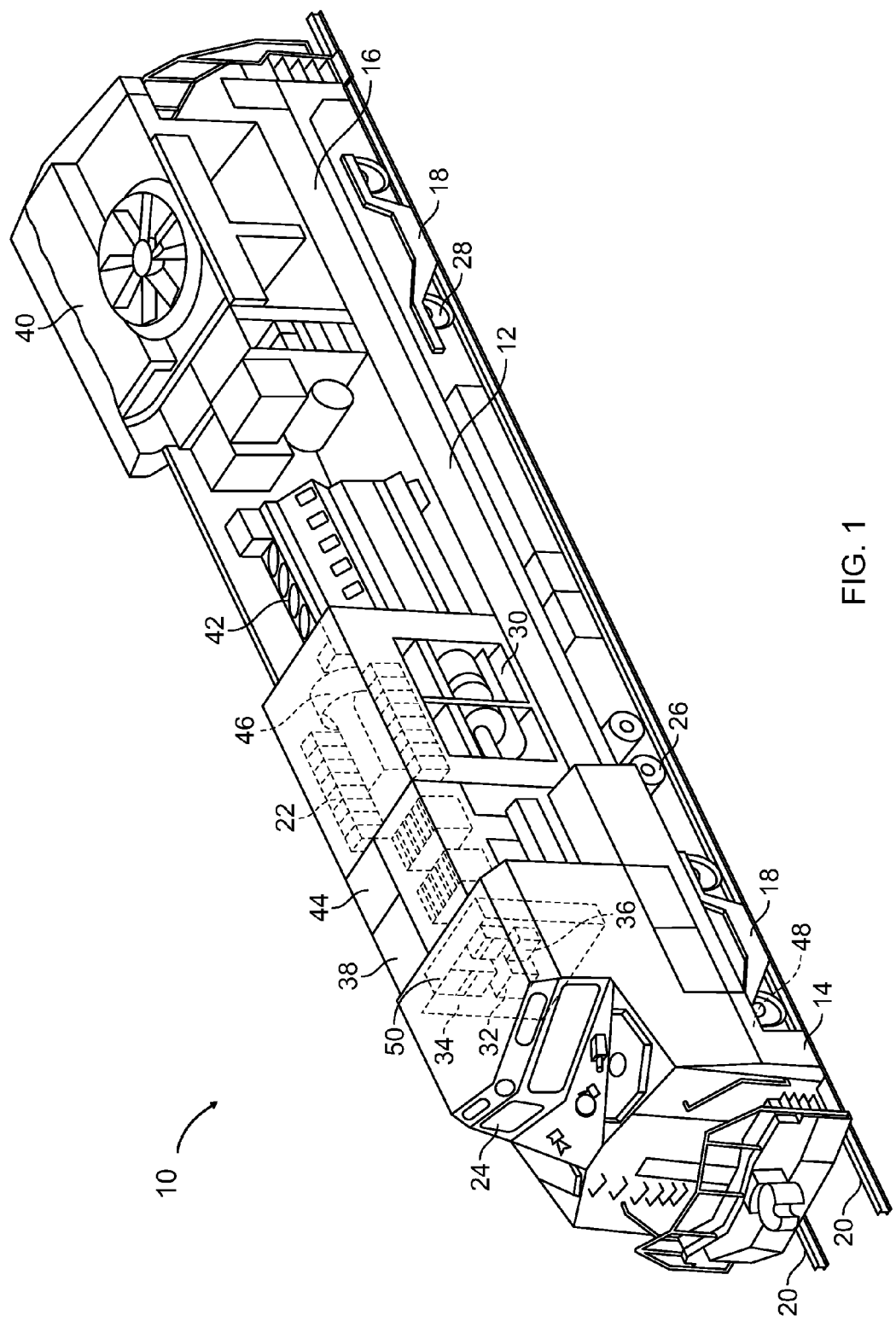
FIG. 1 is a partial cut away view of an exemplary Off-Highway Vehicle (OHV) in accordance with an embodiment of the present invention.

FIG. 1 is a partial cut away view of an exemplary Off-Highway Vehicle (OHV). In the exemplary embodiment, the OHV is a locomotive 10. Locomotive 10 includes a platform 12 having a first end 14 and a second end 16. A propulsion system 18, or truck is coupled to platform 12 for supporting, and propelling platform 12 on a pair of rails 20. An equipment compartment 22 and an operator cab 24 are coupled to platform 12. An air and air brake system 26 provides compressed air to locomotive 10, which uses the compressed air to actuate a plurality of air brakes 28 on locomotive 10 and railcars (not shown) behind it. An auxiliary alternator system 30 supplies power to all auxiliary equipment and is also utilized to recharge one or more on-board power sources. An intra-consist communications system 32 collects, distributes, and displays consist data across all locomotives in a consist.

A cab signal system 34 links the wayside (not shown) to a train control system 36. In particular, system 34 receives coded signals from a pair of rails 20 through track receivers (not shown) located on the front and rear of the locomotive. The information received is used to inform the locomotive operator of the speed limit and operating mode. A distributed power control system 38 enables remote control capability of multiple locomotive consists coupled in the train. System 38 also provides for control of tractive power in motoring and braking, as well as air brake control.

An engine cooling system 40 enables engine 42 and other components to reject heat to cooling water. In addition, system 40 facilitates minimizing engine thermal cycling by maintaining an optimal engine temperature throughout the load range, and facilitates preventing overheating in tunnels. An equipment ventilation system 44 provides cooling to locomotive 10 equipment.

A traction alternator system 46 converts mechanical power to electrical power which is then provided to propulsion system 18. Propulsion system 18 enables locomotive 10 to move and includes at least one traction motor 48 and dynamic braking capability. In particular, propulsion system 18 receives power from traction alternator 46, and through traction motors 48 moves locomotive 10. Locomotive 10 systems are monitored and/or controlled by an energy management system 50.

Energy management system 50 generally includes at least one computer that is programmed to perform the functions described herein. Computer, as used herein, is not limited to just those integrated circuits referred to in the art as a computer, but broadly refers to a processor, a microprocessor, a microcontroller, a programmable logic controller, an application specific integrated circuit, and another programmable circuit, and these terms are used interchangeably herein.

Figure 2:
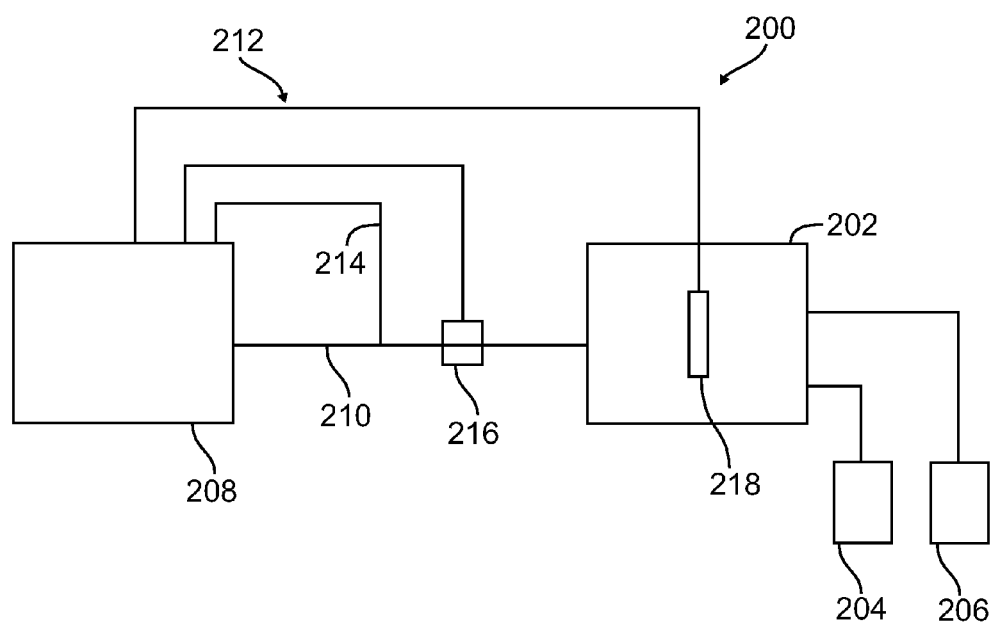
FIG. 2 is a schematic diagram of an onboard charging system in accordance with an embodiment of the present invention.

FIG. 2 is a schematic diagram of an onboard charging system 200 in accordance with an embodiment of the present invention. In the exemplary embodiment, system 200 includes a battery 202 configured to supply cranking current to an engine starter 204 and current to operate auxiliary loads 206. Battery 202 is electrically coupled to a battery charger 208 through a conduit 210. Battery charger 208 is configured to supply charging current to battery 202 during a battery charging process. System 200 includes a plurality of sensors 212 that provide inputs to battery charger 208. Specifically, in the exemplary embodiment, sensors 212 comprises a battery voltage tap 214 configured to sense the open circuit voltage of battery 202 when battery 202 is open circuited. Battery voltage tap 214 also senses battery charger output voltage during the charging process. Sensors 212 also includes a current sensor 216 configured to measure charging current flowing between battery charger 208 and battery 202. A temperature sensor 218 is configured to measure a temperature of the battery. Because measuring the temperature of the plates in the cells of the battery is the ideal battery temperature to monitor during charging, temperature sensor 218 is configured to measure the battery temperature as close to the plates as possible. In one embodiment, temperature sensor 218 comprises a contact temperature sensor coupled to a surface of battery 202. In another embodiment, temperature sensor 218 comprises a contact temperature sensor coupled to an inside surface of battery 202. In still another embodiment, temperature sensor 218 comprises a non-contact temperature sensor configured to sense surface of battery 202 or to sense the temperature of the plates through a non-contact means such as using an infrared sensor.

During operation, current sensor 216 provide a state of charge of battery 202 and transmits a temperature signal to battery charger 208 indicating battery 202 is charged to a predetermined level and battery charger 208 reduces the charge voltage to a float voltage to facilitate maintaining the charge on battery 202. Temperature sensor 218 in contact with a surface of battery 202 measures a more accurate battery temperature than an ambient temperature measured in a vicinity of battery 202. Battery charger 208 uses the battery temperature to temperature correct voltage the charging voltage supplied by battery charger 208. Temperature sensor 218 also provides additional protection in case current sensor 216 fails. Temperature sensor 218 can read an increasing temperature of battery 202 and such that battery charger 208 can reduce the charge voltage to avoid a thermal run away of battery 202 substantially eliminating gassing.

Current sensor 218 may also facilitate assessing the state-of-charge of battery 202 for use by an Auto-Engine-Stop-Start (AESS) system to avoid a premature shut down of engine 42.

Another method of determining a state-of-charge of battery 202 includes stopping battery charger 208 for a predetermined time period for example, one minute and measuring the open circuit battery voltage. Battery charger 208 is configured to determine state-of-charge of battery 202 before shutting down engine 42. If the SOC is less than a predetermined threshold, the charge on battery is resumed for an additional charging time period for example, one hour before checking the SOC again and determining whether engine 42 can be stopped. This method facilitates assuring that engine 42 will crank after shut down and avoid road failures.

Figure 3:
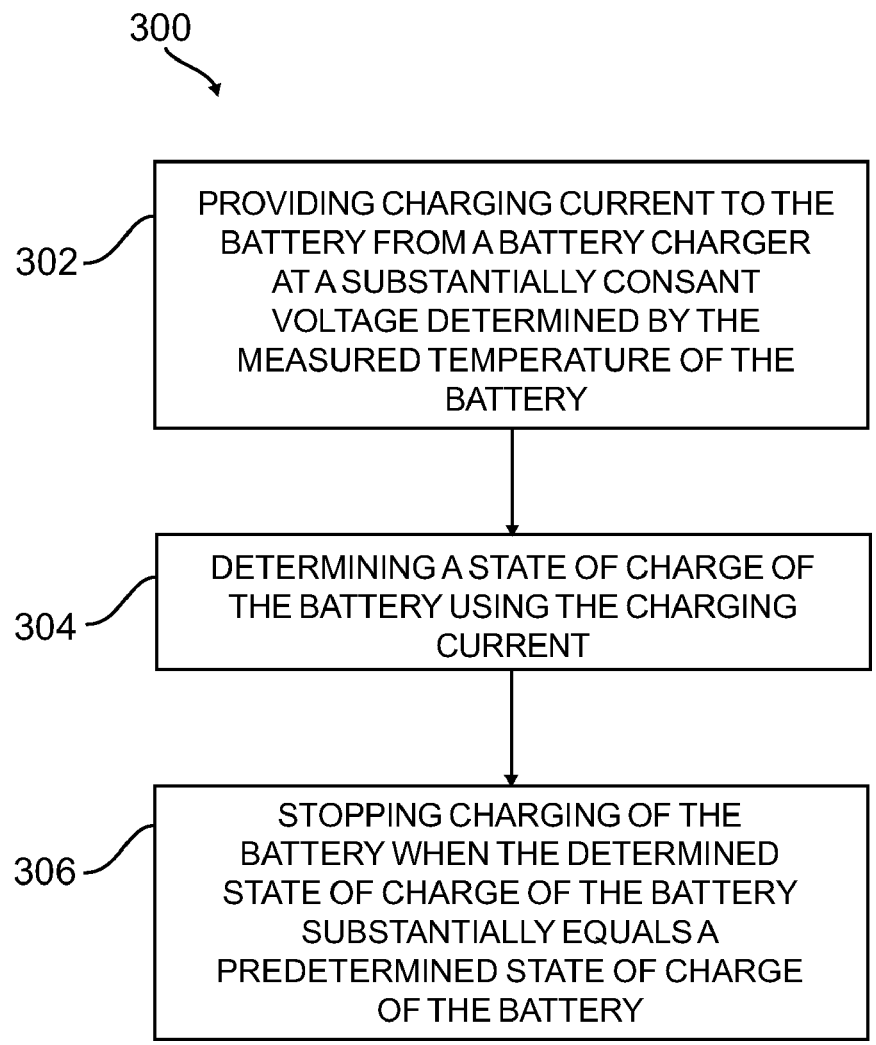
FIG. 3 is a flow chart of an exemplary method of charging a battery in accordance with an embodiment of the present invention.

FIG. 3 is a flow chart of an exemplary method 300 of charging a battery. In the exemplary embodiment, method 300 includes providing 302 charging current to the battery from a battery charger at a substantially constant voltage determined by the measured temperature of the battery. Method 300 also includes determining a state of charge of the battery using the charging current, and stopping charging of the battery when the determined state of charge of the battery substantially equals a predetermined state of charge of the battery.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is automatically charging a battery using measured battery parameters to extend the battery life and reduce battery failures to prevent or reduce the occurrence of road failures. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods and systems of battery charging are cost-effective and highly reliable. The methods and systems facilitate elimination of gassing batteries by controlling the overcharge using current and temperature sensors in a close loop system and facilitate determining a state of charge of the battery using the charging current characteristics or an open circuit voltage of the battery. Accordingly, the methods and systems facilitate operating power sources in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A battery charging system for a vehicle, said system comprising:
    a battery charger electrically coupled to at least one battery; and
    a plurality of sensors including at least one sensor configured to measure a voltage of the battery, at least one sensor configured to measure a charging current supplied to the battery, and at least one sensor configured to measure a temperature of the battery;
    wherein said battery charger is configured to:
        to provide charging current to the battery at a substantially constant voltage;
        determine a state of charge of the battery using at least one of the plurality of sensors;
        determine a rate of gassing of the battery using the temperature and the charging current; and
        reduce a charging rate of the battery when the determined rate of gassing exceeds a predetermined rate of gassing.

2. A system in accordance with claim 1 wherein said battery charger is configured to provide charging current to the battery at a substantially constant voltage wherein the voltage is corrected using the measured temperature of the battery.

3. A system in accordance with claim 1 wherein said battery charger is further configured to:
    determine a state of charge of the battery using the charging current; and
    stop the battery charge when the determined state of charge substantially equals a predetermined state of charge.

4. A system in accordance with claim 1 wherein said battery charger further comprises a battery voltage sensor configured to measure the open circuit voltage of the battery and wherein said battery charger is further configured to determine a state of charge of the battery using the battery voltage sensor.

5. A system in accordance with claim 4 wherein said battery charger is configured to:
    temporarily suspend the battery charge;
    measure the open circuit voltage of the battery after a predetermined amount of time;
    determine the state of charge of the battery using the measured open circuit voltage;
    if the state of charge is less than a predetermined state of charge, resume the battery charge for a predetermined period of time;
    iteratively determine the state of charge of the battery until the state of charge is equal to of greater than the predetermined state of charge.

6. A system in accordance with claim 1 wherein said battery charger is configured to determine a state of charge using a change of charging current over a predetermined period of time.

7. A system in accordance with claim 1 wherein said battery charger is configured to measure the temperature of a surface of the battery using a temperature sensor in contact with the surface of the battery.

8. A method of charging a battery, said method comprising:
    providing a charging current to the battery from a battery charger at a substantially constant voltage determined by a measured temperature of the battery;
    determining a state of charge of the battery using the provided charging current;
    determining a rate of gassing of the battery using the temperature and the charging current; and
    reducing a charging rate of the battery when the determined rate of gassing exceeds a predetermined rate of gassing; and
    stopping charging of the battery when the determined state of charge of the battery substantially equals a predetermined state of charge of the battery.

9. A method in accordance with claim 8 wherein determining a state of charge of the battery using the charging current comprises determining a change of charging current over a predetermined period of time.

10. A method in accordance with claim 8 wherein providing charging current to the battery comprises adjusting a voltage output level of the battery charger to deliver a charging current to the battery wherein the level of charging current is at least partially determined by the state of charge of the battery.

11. A method in accordance with claim 8 further comprising measuring the temperature of a surface of the battery.

12. A method in accordance with claim 8 further comprising measuring the temperature of an internal surface of the battery.

13. A method in accordance with claim 8 further comprising:
    temporarily suspending the battery charge;
    measuring the open circuit voltage of the battery;
    determining a state of charge of the battery using the measured open circuit voltage;
    if the state of charge is less than a predetermined state of charge, resuming the battery charge for a predetermined period of time;
    iteratively determining the state of charge of the battery until the state of charge is equal to or greater than the predetermined state of charge.

* * * * *